United States Patent
Mori et al.

(10) Patent No.: US 9,757,997 B2
(45) Date of Patent: Sep. 12, 2017

(54) WHEEL POSITION DETECTING DEVICE AND TIRE PRESSURE DETECTING APPARATUS HAVING THE SAME

(71) Applicant: DENSO CORPORATION, Kariya, Aichi-pref. (JP)

(72) Inventors: Masashi Mori, Obu (JP); Nobuya Watabe, Nagoya (JP); Noriaki Okada, Chiryu (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 595 days.

(21) Appl. No.: 14/368,257

(22) PCT Filed: Dec. 25, 2012

(86) PCT No.: PCT/JP2012/084268
§ 371 (c)(1),
(2) Date: Jun. 23, 2014

(87) PCT Pub. No.: WO2013/100168
PCT Pub. Date: Jul. 4, 2013

(65) Prior Publication Data
US 2014/0365162 A1 Dec. 11, 2014

(30) Foreign Application Priority Data
Dec. 27, 2011 (JP) .................................. 2011-286186

(51) Int. Cl.
G01P 15/00 (2006.01)
B60C 23/04 (2006.01)
G01P 3/44 (2006.01)

(52) U.S. Cl.
CPC ...... *B60C 23/0488* (2013.01); *B60C 23/0416* (2013.01); *B60C 23/0489* (2013.01); *G01P 3/44* (2013.01); *G01P 15/003* (2013.01)

(58) Field of Classification Search
USPC ........................................................ 702/138
See application file for complete search history.

(56) References Cited

U.S. PATENT DOCUMENTS

| 5,602,524 A | 2/1997 | Mock et al. |
| 6,018,993 A | 2/2000 | Normann et al. |

(Continued)

FOREIGN PATENT DOCUMENTS

| DE | 102009059788 A1 | 6/2011 |
| JP | H10048233 A | 2/1998 |

(Continued)

OTHER PUBLICATIONS

Office Action dated Jun. 23, 2015 in corresponding Korean Application No. 10-2014-7017370.

(Continued)

*Primary Examiner* — Paul D Lee
(74) *Attorney, Agent, or Firm* — Harness, Dickey & Pierce, P.L.C.

(57) ABSTRACT

In a wheel position detecting device, a transmission angular position of a transmitter to transmit a frame from the transmitter to a receiver is changed by a predetermined angle each time the transmitter transmits the frame. A receiver acquires gear information indicating a tooth position of a gear rotating in association with a corresponding wheel, based on a detection signal of a wheel speed sensor. The receiver specifies to which wheels the transmitter is integrated, based on the tooth position of the gear at a reception timing of the frame.

7 Claims, 9 Drawing Sheets

(56) References Cited

U.S. PATENT DOCUMENTS

| | | | |
|---|---|---|---|
| 6,408,690 B1* | 6/2002 | Young | B60C 23/0408 73/146.5 |
| 6,489,888 B1 | 12/2002 | Honeck et al. | |
| 6,525,529 B2* | 2/2003 | Murai | G01D 5/2033 324/166 |
| 6,922,140 B2 | 7/2005 | Hernando et al. | |
| 7,010,968 B2 | 3/2006 | Stewart et al. | |
| 7,336,161 B2 | 2/2008 | Walraet | |
| 7,515,040 B2 | 4/2009 | Mori et al. | |
| 2004/0090322 A1* | 5/2004 | Tsujita | B60C 23/0416 340/442 |
| 2004/0246117 A1* | 12/2004 | Ogawa | B60C 23/0433 340/445 |
| 2005/0172707 A1* | 8/2005 | Kanatani | B60C 23/0416 73/146 |
| 2006/0152353 A1* | 7/2006 | Fischer | B60C 23/0416 340/442 |
| 2006/0250228 A1 | 11/2006 | Mori et al. | |
| 2011/0071737 A1 | 3/2011 | Greer et al. | |
| 2012/0242502 A1* | 9/2012 | Steiner | G08C 17/02 340/870.07 |
| 2012/0259507 A1 | 10/2012 | Fink | |

FOREIGN PATENT DOCUMENTS

| | | |
|---|---|---|
| JP | 3212311 B2 | 9/2001 |
| JP | 2006138803 A | 6/2006 |
| JP | 2006312342 A | 11/2006 |
| JP | 2007015491 A | 1/2007 |
| JP | 2010122023 A | 6/2010 |

OTHER PUBLICATIONS

Office Action in Corresponding JP Application No. 2011-286186 dated Jan. 7, 2014 (Japanese with English Translation).
International Search Report and Written Opinion for PCT/JP2012/0084268, mailed Mar. 25, 2013; ISA/JP.

* cited by examiner

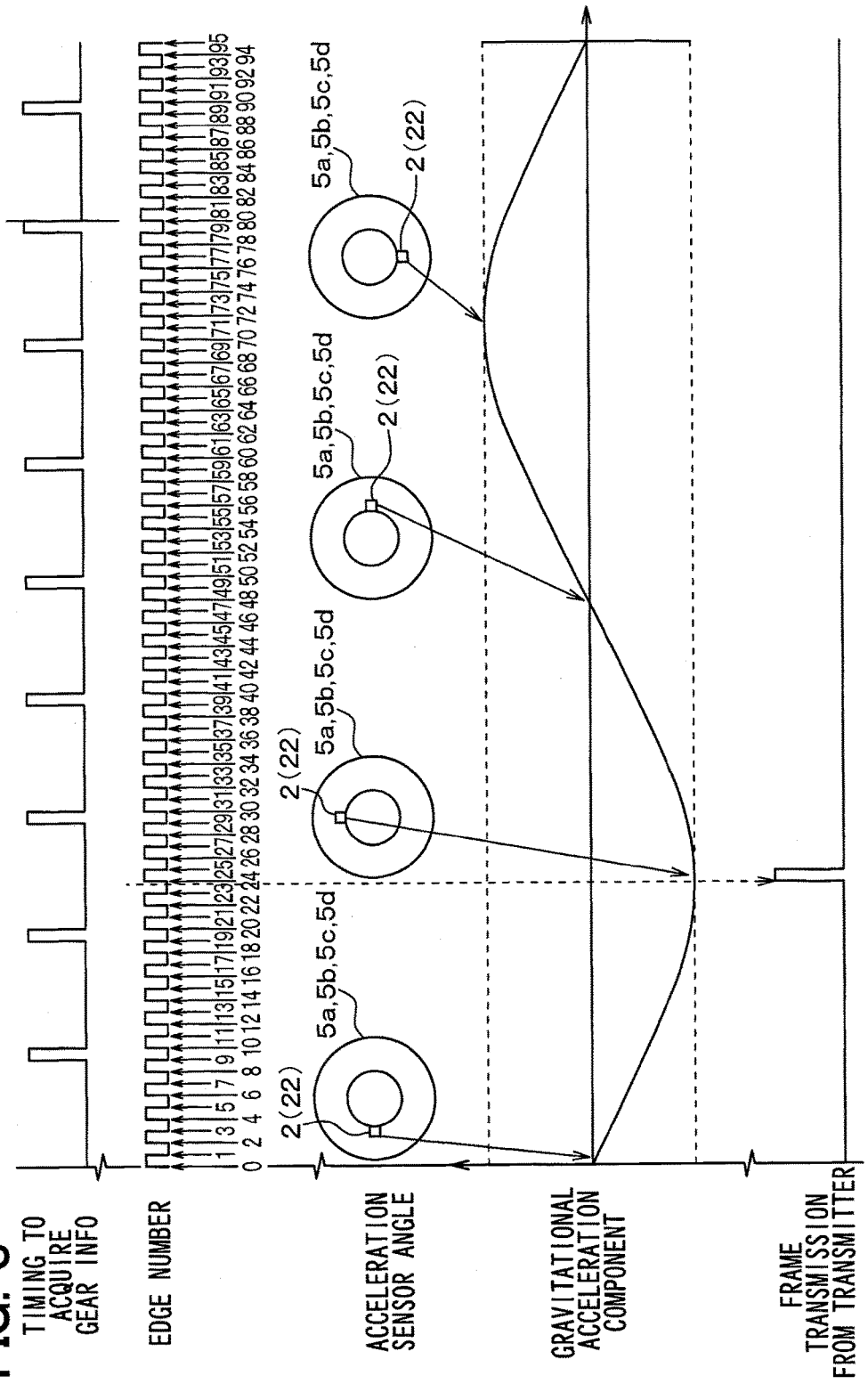

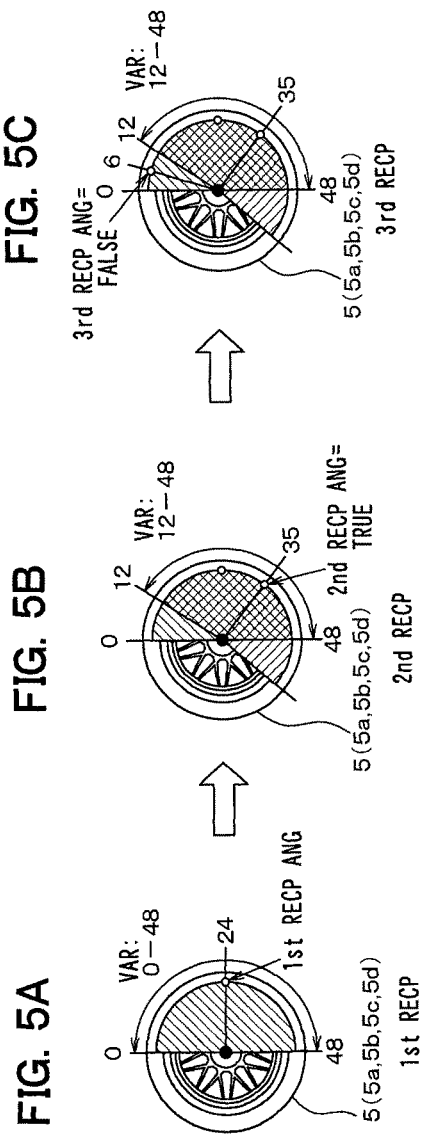

| RECP | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1st | 0.0 | 68 | 92 | 62 | 78 | — | — | — | — |
| 2nd | 5.1 | 56 | 42 | 38 | 8 | TRUE | FALSE | TRUE | FALSE |
| 3rd | 10.3 | 72 | 26 | 42 | 72 | TRUE | | TRUE | |
| 4th | 14.3 | 60 | 62 | 22 | 6 | TRUE | | FALSE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1st | 0.0 | 38 | 68 | 30 | 50 | — | — | — | — |
| 2nd | 4.1 | 2 | 78 | 80 | 46 | FALSE | TRUE | FALSE | TRUE |
| 3rd | 8.3 | 42 | 74 | 14 | 28 | | TRUE | | TRUE |
| 4th | 12.4 | 88 | 78 | 52 | 22 | | TRUE | | FALSE |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1st | 0.0 | 62 | 94 | 54 | 76 | — | — | — | — |
| 2nd | 4.5 | 80 | 66 | 60 | 32 | TRUE | FALSE | TRUE | FALSE |
| 3rd | 9.0 | 92 | 40 | 64 | 88 | FALSE | | TRUE | |

| REC | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1st | 0.0 | 36 | 86 | 24 | 62 | — | — | — | — |
| 2nd | 4.5 | 0 | 6 | 74 | 64 | FALSE | TRUE | FALSE | TRUE |
| 3rd | 8.6 | 62 | 24 | 30 | 70 | | FALSE | | TRUE |

FIG. 8A

| ID | PRES | TEMP. | ERROR DETC. | TRANS COUNT |

FIG. 8B

| ID | PRES | TEMP. | ERROR DETC. |

FIG. 9

| RECP TIMES (=TRANS COUNT) | TIME (t) | TOOTH POSITION AT RECEPTION TIMING (0-95) | | | | WHEEL POSITION SPECIFYING LOGIC (TRUE OR FALSE) | | | |
|---|---|---|---|---|---|---|---|---|---|
| | | FL | FR | RL | RR | FL | FR | RL | RR |
| 1st RECP (SHIFTED ANG = 0°) | 0.0 | 68 | 92 | 61 | 78 | — | — | — | — |
| 2nd RECP (SHIFTED ANG = 90°) | 5.1 | BEF COR.32 AFT COR.56 | BEF COR.18 AFT COR.42 | BEF COR.14 AFT COR.38 | BEF COR.80 AFT COR. 8 | TRUE | FALSE | TRUE | TRUE |
| 3rd RECP (SHIFTED ANG = 180°) | 10.3 | BEF COR.24 AFT COR.72 | BEF COR.74 AFT COR.26 | BEF COR.90 AFT COR.42 | BEF COR.24 AFT COR.72 | TRUE | ╱ | TRUE | TRUE |
| 4th RECP (SHIFTED ANG = 270°) | 14.3 | BEF COR.84 AFT COR.60 | BEF COR.86 AFT COR.62 | BEF COR.46 AFT COR.22 | BEF COR.30 AFT COR. 6 | TRUE | ╱ | TRUE | TRUE |
| 5th RECP (SHIFTED ANG = 0°) | 18.4 | BEF COR.68 AFT COR.68 | BEF COR.76 AFT COR.76 | BEF COR.28 AFT COR.28 | BEF COR.18 AFT COR.18 | TRUE | ╱ | TRUE | FALSE |
| 6th RECP (SHIFTED ANG = 90°) | 30.8 | BEF COR.40 AFT COR.64 | BEF COR.48 AFT COR.72 | BEF COR.84 AFT COR.12 | BEF COR.66 AFT COR.90 | TRUE | ╱ | FALSE | ╱ |

WHEEL POSITION DETECTING DEVICE AND TIRE PRESSURE DETECTING APPARATUS HAVING THE SAME

CROSS REFERENCE TO RELATED APPLICATIONS

This application is a U.S. National Phase Application under 35 U.S.C. 371 of International Application No. PCT/JP2012/084268 filed on Dec. 25, 2012 and published in English as WO/2013/100168 A1 on Jul. 4, 2013. This application is based on Japanese Patent Application No. 2011-286186 filed on Dec. 27, 2011. The disclosures of all of the above applications are incorporated herein by reference.

TECHNICAL FIELD

The present disclosure relates to a wheel position detecting device and a tire pressure detecting apparatus having the wheel position detecting device.

BACKGROUND ART

In general, a wheel position detecting device detects a position of a subject wheel in a vehicle. Also, it is known to use a wheel position detecting device in a tire pressure detecting apparatus for detecting a tire pressure of a wheel. As an example of the tire pressure detecting apparatus, a direct-type tire pressure detecting apparatus has been known.

In the direct-type tire pressure detecting apparatus, a transmitter is directly fixed to a wheel with a tire. The transmitter is provided with a sensor, such as a pressure sensor. A vehicle body is equipped with an antenna and a receiver. When the transmitter transmits a detection signal of the sensor, the receiver receives the detection signal through the antenna, and detects the tire pressure of the wheel based on the detection signal.

In such a direct-type tire pressure detecting apparatus, data transmitted from the transmitter includes ID information for identifying whether the transmitted data relates to a subject vehicle to which the tire pressure detecting apparatus is equipped, and for identifying the wheel to which the transmitter transmitting the data is fixed.

To specify the position of the transmitter based on the ID information of the transmitted data, the receiver stores beforehand a relationship between the ID information of each transmitter and the position of each wheel. When the positions of the wheels are changed by a tire rotation, it is necessary to register the relationship between the ID information of each transmitter and the position of each wheel again. For example, a patent literature 1 describes a tire pressure monitoring apparatus and a tire pressure monitoring method for automatically registering the relationship between the ID information of each transmitter and the position of each wheel.

The tire pressure monitoring apparatus of the patent literature 1 detects that a wheel is at a predetermined rotational position based on an acceleration detection signal of an acceleration sensor provided in the transmitter as well as detects a rotational position of a wheel when the receiver receives a radio signal from a transmitter. The tire pressure monitoring apparatus specifies the position of the wheel by monitoring a change in a relative angle between the rotational position detected by the transmitter and the rotational position of the wheel when the receiver receives the radio signal from the transmitter.

Namely, the change of the relative angle between the rotational position of the wheel detected by a wheel-side unit fixed to the wheel and the rotational position of the wheel detected by a body-side unit fixed to the vehicle body is monitored based on a deviation of predetermined number of data. The position of the wheel is specified by determining whether a variation of the change of the relative angle relative to an initial value is over an acceptable value.

In the method described in the patent literature 1, the radio signal is transmitted when the wheel is at the predetermined rotational position. However, there is a position where the radio signal is likely to be difficult to reach the body-side unit, and such a position is so-called Null. Therefore, if the radio signal is transmitted when the rotational position of the wheel is at the Null, the radio signal is less likely to reach the body-side unit, even if the radio signal is transmitted many times. In such a case, it takes time to detect the position of the wheel, or it is difficult to detect the position of the wheel.

Patent literature 1: Japanese Patent Application Publication No. 2010-122023

SUMMARY

It is an object of the present disclosure to provide a wheel position detecting device capable of properly and smoothly specifying a position of a wheel, and to provide a tire pressure detecting apparatus having the wheel position detecting device.

According to a first aspect of the present disclosure, a wheel position detecting device includes a transmitter, a receiver, and a wheel speed sensor. The transmitter is integrated to each of wheels of a vehicle. The transmitter includes a first control unit generating and transmitting a frame that includes an identification information specific to the transmitter. The receiver is integrated to a vehicle body. The receiver includes an antenna and a second control unit. The second control unit receives the frame transmitted from the transmitter through the antenna. The second control unit performs a wheel position detection to specify which of the plurality of wheels the transmitter transmitting the frame is integrated to and to store a relationship between the identification information of the transmitter and a corresponding wheel to which the transmitter is integrated.

The transmitter further includes an acceleration sensor that outputs a detection signal according to an acceleration containing a gravitational acceleration component that varies with rotation of the corresponding wheel to which the transmitter is integrated. The first control unit detects an angular position of the transmitter relative to a reference position, based on the gravitational acceleration component provided by the detection signal of the acceleration sensor. The reference position is set at any position in a circumferential direction of the corresponding wheel.

The first control unit transmits the frame when the transmitter is at a transmission angular position. The first control unit changes the transmission angular position by a predetermined angle each time the frame is transmitted. The wheel speed sensor is disposed to correspond to each of the wheels to detect a tooth of a gear that rotates in association with the corresponding wheel. The gear includes conductive portions as teeth and intermediate portions between the conductive potions. The intermediate portions have a magnetic resistance different from the conductive portions. The second control unit acquires a gear information indicating a tooth position of the gear based on a detection signal of the wheel speed sensor. The second control unit specifies which of the plurality of wheels the transmitter is integrated to based on the tooth position of the gear at a reception timing of the frame.

In the above wheel position detecting device, the transmission angular position of the transmitter is changed by the predetermined angle each time the transmitter transmits the frame. Therefore, the frame is properly received by the receiver. The wheel position detection is performed properly and smoothly.

According to a second aspect of the present disclosure, the second control unit sets a variation allowance range of the tooth position based on the tooth position of the gear at the reception timing of the frame. The second control unit determines whether the tooth position of the gear at a subsequent reception timing of the frame is within the variation allowance range. When the tooth position of the gear at the subsequent reception timing is not within the variation allowance range, the second control unit excludes the wheel corresponding to the gear from candidate wheels until one wheel remains, and registers the one wheel as the wheel to which the transmitter is integrated.

Further, the second control unit changes the variation allowance range each time the frame is received. The second control unit sets an overlapping range between the variation allowance range and a previous variation allowance range set based on the tooth position of the gear at a previous reception timing of the frame, as a new variation allowance range. The second control unit corrects the tooth position of the gear detected at the reception timing associated with the frame that is transmitted at a transmission angular position changed by the first control unit to a tooth position associated with a frame that is transmitted at a fixed transmission angular position. The second control unit determines whether the teeth position of the gear corrected is within the variation allowance range, to specify the wheel to which the transmitter is integrated.

According to a third aspect of the present disclosure, in place of correcting the tooth position detected, the second control unit calculates an overlapping range between the variation allowance range and a first added variation allowance range that is provided by adding a predetermined variation allowance range to a previous variation allowance range set at a previous reception timing of the frame. The second control unit sets a second added variation allowance range that is provided by adding the predetermined variation allowance range to the overlapping range calculated, as a new variation allowance range.

The wheel position detecting device according to the first through third aspect described above may be employed to a tire pressure detecting apparatus. In such a case, the transmitter includes a sensing unit that outputs a detection signal according to a tire pressure of the corresponding wheel. The first control unit generates a tire pressure information indicating the detection signal of the sensing unit. The first control unit adds the tire pressure information in the frame, and transmits the frame. The second control unit detects the tire pressure of each wheel based on the tire pressure information included in the frame.

BRIEF DESCRIPTION OF THE DRAWINGS

The above and other objects, features and advantages of the present disclosure will become more apparent from the following detailed description made with reference to the accompanying drawings. In the drawings:

FIG. 3 is a time chart for explaining a wheel position detection performed by the wheel position detection according to the embodiment;

FIG. 5A is a schematic diagram for explaining a variation allowance range used in a wheel position specifying logic according to the embodiment;

FIG. 5B is a schematic diagram for explaining the variation allowance range used in the wheel position specifying logic according to the embodiment;

FIG. 5C is a schematic diagram for explaining the variation allowance range used in the wheel position specifying logic according to the embodiment;

FIG. 6A is a diagram illustrating an evaluation result of the wheel position specifying logic with regard to a frame including first identification information according to the embodiment;

FIG. 6B is a diagram illustrating an evaluation result of the wheel position specifying logic with regard to a frame including second identification information according to the embodiment;

FIG. 6C is a diagram illustrating an evaluation result of the wheel position specifying logic with regard to a frame including third identification information according to the embodiment;

FIG. 6D is a diagram illustrating an evaluation result of the wheel position specifying logic with regard to a frame including fourth identification information according to the embodiment;

FIG. 8A is a schematic diagram of an example of a frame transmitted from the transmitter according to the embodiment;

FIG. 8B is a schematic diagram of another example of a frame transmitted from the transmitter according to the embodiment; and FIG. 9 is a diagram illustrating an evaluation result of a wheel position specifying logic of a case where the angle of the transmitter is changed each time the transmitter transmits the frame according to the embodiment.

DESCRIPTION OF EMBODIMENTS

Figure 1:
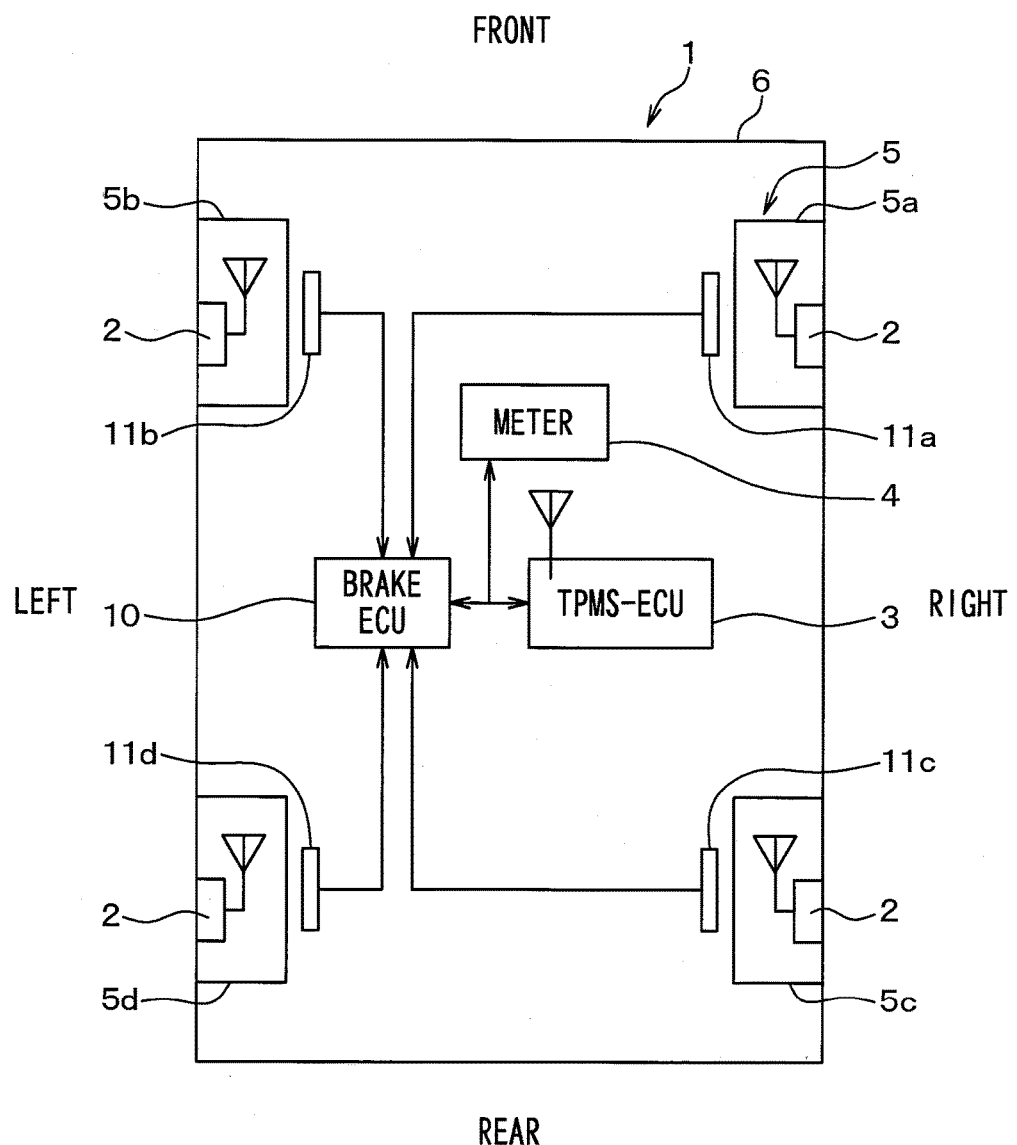
FIG. 1 is a schematic diagram for illustrating an overall structure of a wheel position detecting device and an overall structure of a tire pressure detecting apparatus employing the wheel position detecting device, according to an embodiment of the present disclosure.

Hereinafter, embodiments of the present disclosure will be described with reference to the drawings. Like parts will be designated with like reference numerals throughout the embodiments.

An embodiment will be described with reference to FIGS. 1 to 9.

FIG. 1 is a schematic diagram illustrating an overall structure of a wheel position detecting device and an overall structure of a tire pressure detecting apparatus in a vehicle 1. In FIG. 1, an upward direction corresponds to a frontward direction of the vehicle 1, and a downward direction corresponds to a rearward direction of the vehicle 1. The tire pressure detecting apparatus according to the present embodiment will be described with reference to FIG. 1.

The tire pressure detecting apparatus is equipped to the vehicle 1. The tire pressure detecting apparatus includes a transmitter 2, a tire pressure monitoring system electronic control unit (hereinafter referred to as the TPMS-ECU) 3, and a meter 4. The TPMS-ECU 3 serves as a receiver.

The wheel position detecting device uses the transmitter 2 and the TPMS-ECU 3 of the tire pressure detecting apparatus. The wheel position detecting device specifies a position of a wheel 5 (5a-5d) by acquiring gear information from a brake electronic control unit (hereinafter referred to as the brake ECU) 10. The gear information is provided based on a detection signal of a wheel speed sensor 11a-11d, which is disposed to correspond each of the wheels 5a-5d.

The transmitter 2 is integrated to each of the wheels 5a-5d. The transmitter 2 detects a tire pressure, such as a tie air pressure, of the corresponding wheel 5a-5d. The transmitter 2 stores a result of detection of the tire pressure, as information regarding a tire pressure, in a frame, and transmits the frame.

The TPMS-ECU 3 is integrated to a body 6 of the vehicle 1. The TPMS-ECU 3 receives the frame transmitted from the transmitter 2. Further, the TPMS-ECU 3 performs a wheel position detection and a tire pressure detection by executing various processes and computations based on data stored in the frame.

Figure 2A:
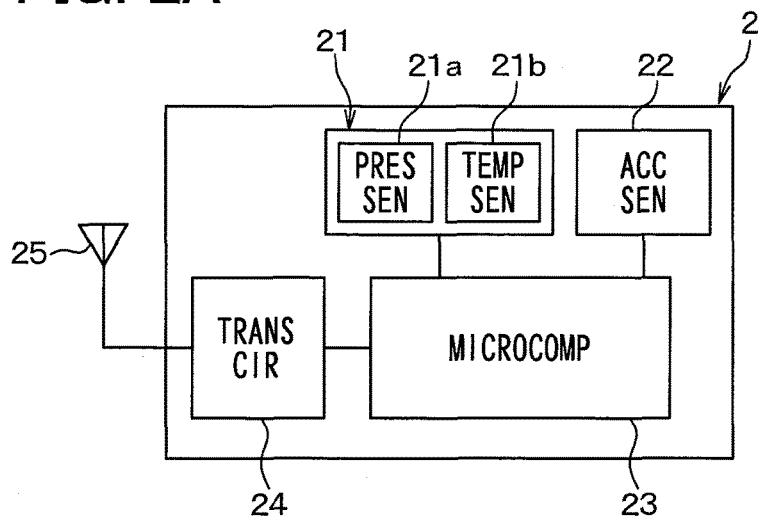
FIG. 2A is a schematic block diagram of a transmitter of the wheel position detecting device according to the embodiment.
Figure 2B:
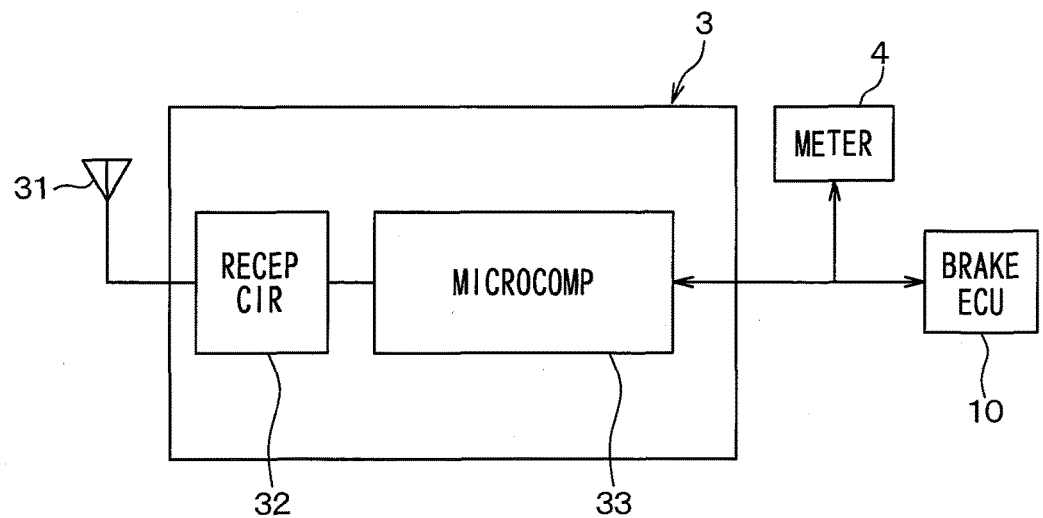
FIG. 2B is a schematic block diagram of a receiver of the wheel position detecting device according to the embodiment.

For example, the transmitter 2 generates the frame by a frequency shift keying (FSK). The TPMS-ECU 3 demodulates the frame to read data in the frame, and detects the wheel position and the tire pressure based on the data read. FIG. 2A is a schematic block diagram of the transmitter 2, and FIG. 2B is a schematic block diagram of the TPMS-ECU 3.

As shown in FIG. 2A, the transmitter 2 includes a sensing unit 21, an acceleration sensor 22, a microcomputer 23, a transmission circuit 24 and a transmitting antenna 25. The sensing unit 21, the acceleration sensor 22, the microcomputer 23, the transmission circuit 24 and the transmitting antenna 25 are driven by electric power supplied from a battery (not shown).

The sensing unit 21 includes a pressure sensor 21a and a temperature sensor 21b. The pressure sensor 21a is, for example, a diaphragm-type pressure sensor. The sensing unit 21 outputs a detection signal according to the tire pressure, and a detection signal according to a temperature.

The acceleration sensor 22 is used for detecting its position within the corresponding wheel 5a-5d to which the transmitter 2 is integrated. That is, the acceleration sensor 22 is used for detecting a position of the transmitter 2. Also, the acceleration sensor 22 is used for detecting a speed of the vehicle 1. The acceleration sensor 22 outputs a detection signal according to accelerations in both radial directions of the corresponding wheel 5a-5d, that is, accelerations in both directions perpendicular to a circumferential direction of the corresponding wheel 5a-5d.

The microcomputer 23 may be a well-known type microcomputer. The microcomputer 23 includes a control unit (first control unit) and the like. The microcomputer 23 performs a predetermined process in accordance with a program stored in a memory of the control unit. The memory of the control unit has individual ID information including transmitter identification information and vehicle identification information. The transmitter identification information is specific to the subject transmitter 2 for identifying the subject transmitter 2. The vehicle identification information is specific to the subject vehicle 1 to identify the subject vehicle 1.

The microcomputer 23 receives the detection signal indicating the tire pressure from the sensing unit 21, and processes the detection signal to generate the information regarding the tire pressure. Further, the microcomputer 23 stores the information regarding the tire pressure as well as the ID information of the subject transmitter 2 in the frame.

Also, the microcomputer 23 monitors the detection signal from the acceleration sensor 22. The microcomputer 23 detects the position of the subject transmitter 2 within the corresponding wheel 5a-5d, and detects the speed of the vehicle 1 based on the detection signal from the acceleration sensor 22.

When the microcomputer 23 generates the frame, the microcomputer 23 transmits the frame (data) toward the TPMS-ECU 3 through the transmission circuit 24 and the transmission antenna 25, based on detection results of the position of the subject transmitter 2 and the speed of the vehicle 1.

In particular, the microcomputer 23 begins to transmit the frame when the vehicle 1 is traveling. Further, the microcomputer 23 transmits the frame each time the acceleration sensor 22 is at a predetermined angular position relative to a reference position, based on the detection signal of the acceleration sensor 22. The microcomputer 23 determines whether the vehicle 1 is traveling, based on the detection result of the acceleration sensor 22. Also, the microcomputer 23 determines the angular position of the acceleration sensor 22 based on the detection result of the position of the transmitter 2, which is obtained based on the detection signal of the acceleration sensor 22.

Namely, the microcomputer 23 detects the vehicle speed using the detection signal of the acceleration sensor 22, and determines that the vehicle 1 is traveling when the vehicle speed is equal to or greater than a predetermined speed, such as 5 km/h or more. The output of the acceleration sensor 22 contains an acceleration (centrifugal acceleration) based on a centrifugal force.

The vehicle speed is calculated by integrating the centrifugal accelerations and multiplying a coefficient. Therefore, the microcomputer 23 calculates the centrifugal acceleration by removing a gravitational acceleration component from the output of the acceleration sensor 22, and calculates the vehicle speed based on the calculated centrifugal acceleration.

The acceleration sensor 22 outputs the detection signal according to rotation of the corresponding wheel 5a-5d. Therefore, when the vehicle 1 is traveling, the detection signal of the acceleration sensor 22 contains the gravitational acceleration. As such, the detection signal has an amplitude according to the rotation of the corresponding wheel 5a-5d.

For example, the amplitude of the detection signal has a maximum negative value when the transmitter 2 is located right above a center axis of the corresponding wheel 5a-5d (wheel center axis), and has a maximum positive value when the transmitter 2 is located right under the wheel center axis.

Further, the amplitude of the detection signal has a value of zero when the transmitter 2 is at the same level as the wheel center axis.

Therefore, the angular position of the acceleration sensor 22 can be detected based on the amplitude. For example, a position right above the wheel center axis is defined as reference position, such as a zero degree position. The angular position of the acceleration sensor 22 is defined relative to the reference position. The reference position may be any position on a circumferential direction of the wheel 5a-5d.

The transmitter 2 begins to transmit the frame when the vehicle speed reaches a predetermined speed or when the acceleration sensor 22 is at the predetermined angular position after the vehicle speed reaches the predetermined speed. Further, the transmitter 2 may transmit the frame each time the acceleration sensor 22 reaches the angular position same as the angular position when the frame is transmitted first time, as a transmission timing. Namely, the transmitter 2 repeatedly transmits the frame.

With regard to the transmission timing, the frame may be transmitted each time the acceleration sensor 22 reaches the angular position same as the angular position when the frame is transmitted first time. However, it may be not always necessary to transmit the frame each time the acceleration sensor 22 reaches the same angular position. Considering a battery life, the transmitter 2 may transmit the frame at a predetermined interval, such as every 15 seconds.

The transmission circuit 24 serves as an output unit that receives the frame provided from the microcomputer 23 and transmits the frame toward the TPMS-ECU 3 through the transmission antenna 25. For example, the frame is transmitted through an RF band radio wave.

The transmitter 2 is, for example, fixed to an air injection valve of the corresponding wheel 5a-5d such that the sensing unit 21 exposes inside of the tire. The pressure sensor 21a of the transmitter 2 detects the tire pressure. As described above, when the vehicle speed exceeds the predetermined speed, the transmitter 2 transmits the frame through the transmission antenna 25 each time the acceleration sensor 22 is at the predetermined angular position.

Thereafter, it may be possible to continuously transmit the frame each time the acceleration sensor 22 is at the predetermined angular position. However, considering the battery life, it is preferable to increase a transmission interval. Therefore, when a predetermined time period necessary for specifying the wheel position has elapsed, the transmitter 2 may be switched from a wheel position specifying mode to a regular transmission mode.

In the regular transmission mode, the transmitter 2 regularly transmits the frame toward the TPMS-ECU 3 at a constant interval, such as every one minute, which is longer than the transmission interval in the wheel position specifying mode. In this case, for example, it may be possible to differentiate the transmission timing of the frame between the transmitters 2 by setting a random delay for each transmitter 2. In such a case, interference of the radio waves from the plural transmitters 2 will be reduced, and the frames will be properly received by the TPMS-ECU 3.

As shown in FIG. 2B, the TPMS-ECU 3 includes a reception antenna 31, a reception circuit 32, and a microcomputer 33. The TPMS-ECU 3 acquires the gear information from the brake ECU 10 through an in-vehicle local area network (LAN), such as a controller area network (CAN).

In the vehicle 1, gears 12a-12d are disposed to rotate in association with the wheels 5a-5d, respectively. The TPMS-ECU 3 obtains a tooth position of each gear 12a-12d, which is represented by an edge number or a tooth number, based on the gear information.

The reception antenna 31 is provided to receive the frame transmitted from each transmitter 2. The reception antenna 31 is fixed to the vehicle body 6. The reception antenna 31 may be an internal antenna disposed inside of a body of the TPMS-ECU 3. Alternatively, the reception antenna 31 may be an external antenna disposed outside of the body of the TPMS-ECU 3 and connected to the body of the TPMS-ECU 3 through a wire.

The reception circuit 32 serves as an input section that receives the frame transmitted from each transmitter 2 through the reception antenna 31, and sends the frame to the microcomputer 33. Namely, when the reception circuit 32 receives a signal (frame) through the reception antenna 31, the reception circuit 32 transmits the received signal to the microcomputer 33.

The microcomputer 33 corresponds to a second control unit. The microcomputer 33 performs a wheel position detection process in accordance with a program stored in a memory of the microcomputer 33. In particular, the microcomputer 33 performs the wheel position detection based on a relationship between information acquired from the brake ECU 10 and a reception timing receiving the frame transmitted from the transmitter 2. The microcomputer 33 acquires the gear information from the brake ECU 10 at a predetermined time interval, such as every 10 milliseconds.

The gear information indicates the tooth position of the gear 12a-12d rotating in association with the corresponding wheel 5a-5d. The tooth position of the gear 12a-12d is detected using wheel speed sensor 11a-11d disposed to correspond to the gear 12a-12d.

For example, the wheel speed sensor 11a-11d is provided by an electromagnetic pick-up sensor disposed to oppose teeth of the corresponding gear 12a-12d. A detection signal outputted from the wheel speed sensor 11a-11d changes according to the teeth of the gear 12a-12d passing through the wheel speed sensor 11a-11d. The wheel speed sensor 11a-11d outputs a rectangular pulse wave corresponding to the teeth, as the detection signal. Edges of the teeth of the gear 12a-12d are indicated by rising edges and falling edges of the rectangular pulse wave.

The brake ECU 10 detects the edge number, that is, counts the number of edges being passed through the wheel speed sensor 11a-11d based on the number of rising edges and falling edges of the detection signal. The brake ECU 10 provides a current edge number to the microcomputer 33 at a predetermined interval, as the gear information. Therefore, the microcomputer 33 can determine which tooth of the gear 12a-12d passes through the wheel speed sensor 11a-11d at a timing.

The edge number is reset each time the gear 12a-12d rotates one revolution. For example, in a case of gear having 48 teeth, the number of edges is 96. In this case, the edge number is counted from 0 to 95. When the edge number counted reaches 95, the edge number returns to 0, and is counted again from zero.

In the example described above, the edge number is provided from the brake ECU 10 to the microcomputer 33 as the gear information. As another example, a tooth number, that is, the number of teeth counted may be provided from the brake ECU 10 to the microcomputer 33 as the gear information. As further another example, the number of edges or the number of teeth, which has passed through the wheel speed sensor 11a-11d in a predetermined period, may be provided to the microcomputer 33, and the microcomputer 33 may add the number of edges or the number of teeth provided to a previous edge number or tooth number, to detect the edge number or the tooth number. That is, a way of detecting the edge number or the tooth number may not be limited to a specific way as long as the microcomputer 33 ultimately obtains the edge number or the tooth number as the gear information.

The brake ECU 10 resets the edge number or the tooth number when the power supply is turned off. The brake ECU 10 begins to count the edge number or the tooth number again when the power supply is turned on or when the vehicle speed reaches the predetermined speed after the power supply is turned on. In this way, even if the edge number or the tooth number is reset every time the power supply is turned off, the same tooth is indicated with the same edge number or the same tooth number during the electric power being off.

When the microcomputer 33 receives the frame transmitted from each transmitter 2, the microcomputer 33 measures the reception timing receiving the frame, and performs the wheel position detection based on the edge number or the tooth number at the reception timing of the frame among the edge numbers or the tooth numbers acquired. Therefore, the wheel position detection to specify which of the wheels 5a-5d each transmitter 2 is integrated to can be performed. The wheel position detection will be described later more in detail.

The microcomputer 33 stores a relationship between the ID information of each transmitter 2 and the position of each wheel 5a-5d to which the transmitter 2 is integrated, based on the result of the wheel position detection. Thereafter, the microcomputer 33 detects the tire pressure of each wheel 5a-5d based on the ID information and the information on the tire pressure, which are stored in the frame transmitted from each transmitter 2. Further, the microcomputer 33 outputs an electric signal according to the tire pressure to the meter 4 through the in-vehicle LAN, such as the CAN.

For example, the microcomputer 33 detects a decrease in pressure of the tire by comparing the detected tire pressure to a predetermined threshold. When the microcomputer 33 detects the decrease in pressure of the tire, the microcomputer 33 outputs a signal indicating the decrease in pressure of the tire to the meter 4. Namely, the microcomputer 33 can notify the meter 4 of the position of the wheel 5a-5d whose tire pressure is decreased.

The meter 4 serves as a warning section. As shown in FIG. 1, the meter 4 is disposed at a position which can be seen by a driver. For example, the meter 4 is a meter display and the like disposed within an instrument panel of the vehicle 1. For example, when the meter 4 receives the signal indicating the decrease in tire pressure from the microcomputer 33 of the TPMS-ECU 3, the meter 4 displays the decrease in tire pressure with the indication of the wheel 5a-5d. Namely, the meter 4 notifies the driver of the decrease in tire pressure of a certain wheel 5a-5d.

Next, an operation of the tire pressure detecting apparatus will be described. In the following description, the wheel position detection and the tire pressure detection, which are performed by the tire pressure detecting apparatus, will be explained separately.

First, the wheel position detection will be described.

Figure 4:
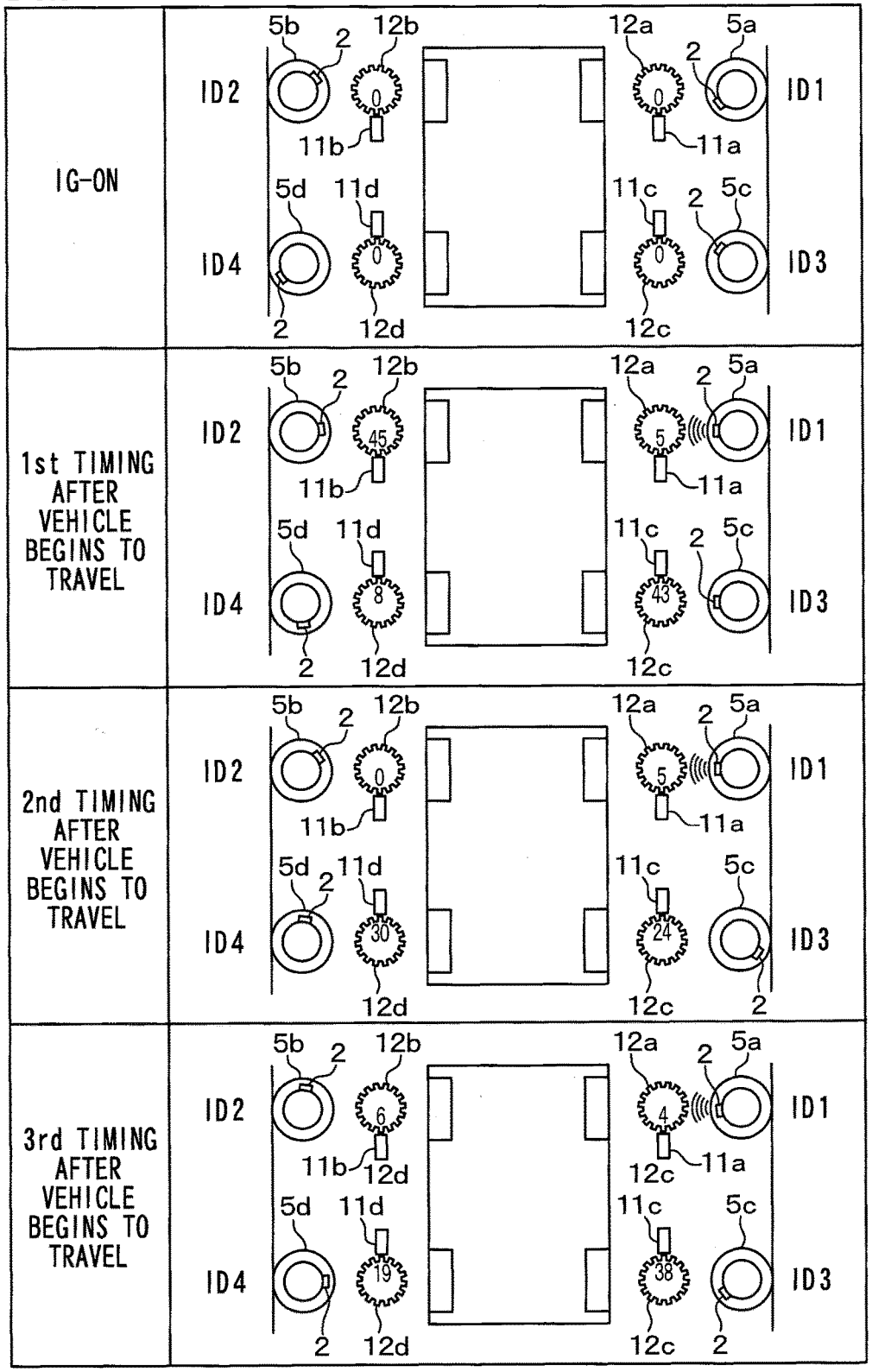
FIG. 4 is a schematic diagram for illustrating a change of gear information according to the embodiment.

As a reference, an operation of the wheel position detection without considering the Null will be firstly described. FIG. 3 is a time chart for explaining the wheel position detection. FIG. 4 is a diagram illustrating an image of a change of the gear information after an ignition switch is turned on and the vehicle 1 begins to travel. For example, FIG. 4 illustrates the gear information when the ignition switch is turned on and at first to third timings after the vehicle 1 begins to travel. FIGS. 5A to 5C are schematic diagrams for explaining a wheel position specifying logic. FIGS. 6A to 6D are charts illustrating evaluation results in the wheel position specifying logic. The method for specifying the positions of the wheels 5a-5d will be described in detail with reference to FIGS. 3 to 6D.

In the transmitter 2, the microcomputer 23 is supplied with electric power from the battery. The microcomputer 23 monitors the detection signal of the acceleration sensor 22 at a predetermined sampling interval to detect the vehicle speed and the angular position of the acceleration sensor 22 within the corresponding wheel 5a-5d.

After the vehicle speed reaches a predetermined speed, the microcomputer 23 transmits the frame each time the acceleration sensor 22 is at a predetermined angular position. For example, the transmitter 2 beings to transmit the frame when the vehicle speed reaches the predetermined speed, or when the acceleration sensor 22 reaches a predetermined angular position after the vehicle speed reaches the predetermined speed. Thereafter, the transmitter 2 transmits the frame each time the acceleration sensor 22 is at the angular position same as the angular position when the frame is transmitted first time.

The gravitational acceleration component of the detection signal outputted from the acceleration sensor 22 has a sine curve, as shown in FIG. 3. The angular position of the acceleration sensor 22 is realized based on the sine curve. Therefore, the frame is transmitted each time the acceleration sensor 22 reaches the same angular position based on the sine curve.

The TPMS-ECU 3 acquires the gear information indicating the tooth position of each gears 12a-12d at a predetermined interval, such as every 10 milliseconds, from the brake ECU 10. The TPMS-ECU 3 measures the reception timing of the frame transmitted from each transmitter 2, and detects the edge numbers or the tooth numbers of the gears 12a-12d at the reception timing of the frame among the edge numbers or the tooth numbers acquired.

In this case, it is not always true that the reception timing of the frame transmitted from the subject transmitter 2 and the timing of acquiring the gear information from the brake ECU 10 coincide with each other. For example, the edge number or the tooth number of the gear information acquired at a timing that is the closest to the reception timing of the frame, that is, the edge number or the tooth number of the gear information acquired at a timing immediately before or immediately after the reception timing of the frame may be used as the edge number or the tooth number at the reception timing of the frame.

As another example, the edge number or the tooth number at the reception timing of the frame may be calculated using the edge number or the tooth number indicated by the gear information acquired at the timing immediately before or immediately after the reception timing of the frame. For example, an intermediate number between the edge number or the tooth number of the gear information acquired at the timing immediately before the reception timing of the frame and the edge number of the tooth number of the gear information acquired at the timing immediately after the reception timing of the frame may be used as the edge number or the tooth number of the reception timing of the frame.

The TPMS-ECU 3 detects the edge number or the tooth number at the reception timing of the frame each time the TPMS-ECU 3 receives the frame. The TPMS-ECU 3 performs the wheel position detection based on the detected edge number or tooth number at the reception timing of the frame. In particular, the wheel position detection is performed by determining whether a variation of the detected edge number or tooth number at the reception timings of the frame is within a predetermined range that is set based on the edge number or the tooth number at the previous reception timing.

In regard to the wheel 5a-5d to which the subject transmitter 2 transmitting the frame is integrated, the transmitter 2 transmits the frame each time the acceleration sensor 22 is at the predetermined angular position. Therefore, the tooth position indicated by the edge number or the tooth number at the reception timing of the frame is substantially the same with the tooth position at the previous reception timing. Therefore, the variation of the edge numbers or the tooth numbers at the reception timings of the frame is small, and is within a predetermined range. Even if the frames are received at many times, the tooth positions indicated by the edge numbers or the tooth numbers at the reception timings of the frame are substantially the same. The variation of the edge number or the tooth number at each reception timing of the frame is within a predetermined range set based on the edge number or the tooth number at the first reception timing of the frame.

On the other hand, in regard to the wheel 5a-5d different from the subject wheel 5a-5d, the tooth position indicated by the edge number or the tooth number at the reception timing of the frame transmitted from the transmitter 2 integrated to the wheel 5a-5d is different from the tooth position at the reception timing of the frame transmitted from the transmitter 2 integrated to the subject wheel 5a-5d.

Namely, the gear 12a-12d of the wheel speed sensor 11a-11d rotates in association with the corresponding wheel 5a-5d. Therefore, with regard to the subject wheel 5a-5d, the tooth position indicated by the edge number or the tooth number at the reception timing of the frame is substantially equal. In fact, the wheels 5a-5d have different rotating states due to a road condition, a turning, a lane changing and the like. Therefore, the rotating states of the wheels 5a-5d are not completely the same. As such, the tooth position indicated by the edge number or the tooth number at the reception timing is different between the wheels 5a-5d.

For example, the edge number of each of gears 12a-12d is zero when the ignition switch (IG) is turned on, as shown in FIG. 4. After the vehicle begins to travel, the transmitters 2 transmit the frames. In this case, at the reception timing of the frame transmitted from the transmitter 2 integrated to the wheel 5a, the tooth positions of the gears 12b-12d rotating in association with the wheels 5b-5d are different from the tooth position of the gear 12a rotating in association with the wheel 5a, as shown in the first through third timings in FIG. 4. Therefore, the wheel position is specified by determining whether a variation of the tooth position of the gear 12a-12d is within a predetermined range.

For example, as shown in FIG. 5A, the angular position of the subject transmitter 2 when the subject transmitter 2 transmits the frame first time is at a first reception angle An 1. In this case, a variation allowance range VAR, which is an allowable range of the variation of the edge number or the tooth number, is set at a range of 180 degrees centering on the first reception angle An1, that is, as a range of +/−90 degrees of the first reception angle An1. For example, the variation allowance range set based on the edge number or the tooth number at the first reception timing is referred to as a first variation allowance range.

In case of the edge number, the first variation allowance range VAR is set at a range of +/−24 of the edge number at the first reception timing. In case of the tooth number, the first variation allowance range VAR is set at a range of +/−12 of the tooth number at the first reception timing.

Then, as shown in FIG. 5B, it is determined whether the edge number or the tooth number at the second reception timing of the frame is within the first variation allowance range VAR set by the edge number or the tooth number at the first reception timing of the frame. At the second reception timing of the frame, if the edge number or the tooth number of the gear 12a-12d is within the variation allowance range VAR, there is a possibility that the wheel 5a-5d corresponding this gear 12a-12d is the wheel 5a-5d to which the subject transmitter 2 transmitting the frame is integrated. Thus, this determination result is indicated as "TRUE".

Further, a second variation allowance range is set based on the angular position of the transmitter 2 when the transmitter 2 transmits the frame second time. The angular position of the transmitter 2 when the transmitter 2 transmits the frame second time is referred to as a second reception angle An2. As shown in FIG. 5B, the second variation allowance range is set to a range of 180 degrees centering on the second reception angle An 2. That is, the second variation allowance range VAR is set to a range of +/−90 degrees of the second reception angle An 2.

Furthermore, a new variation allowance range VAR is set by an overlapping range where the first variation allowance range and the second variation allowance range overlap with each other, as a third variation allowance range. For example, the third variation allowance range is set to a range where the edge number is from 12 to 48, as shown in FIG. 5B. In this way, the variation allowance range VAR is reduced to the third variation allowance range.

As shown in FIG. 5C, it is determined whether the edge number or the tooth number at the third reception timing of the frame is within the third variation allowance range. If the edge number of the tooth number of the gear 12a-12d at the third reception timing of the frame is not within the third variation allowance range, the wheel 5a-5d corresponding this gear 12a-12d is not the wheel 5a-5d to which the subject transmitter 2 transmitting the frame is integrated. Thus, this determination result is indicated as "FALSE".

In this case, when the edge number or the tooth number at the third reception timing of the frame is outside of the third variation allowance range, even within the first variation allowance range, the determination result is indicated as "FALSE". In FIG. 5C, An3 denotes to a third reception angle of the transmitter 2 when the transmitter 2 transmits the frame third time.

In this way, the microcomputer 33 determines to which wheel 5a-5d the subject transmitter 2 transmitting the frame is integrated.

As shown in FIG. 6A, each time the frame including first identification information ID1 as the identification information is received, the microcomputer 33 detects the edge numbers or the tooth numbers of the gears 12a-12d. The microcomputer 33 stores the edge numbers or the tooth numbers for corresponding wheels 5a-5d, such as a front left wheel FL, a front right wheel FR, a rear left wheel RL and a rear right wheel RR.

Further, each time the frame is received, the microcomputer 33 determines whether each of the detected edge numbers or the tooth numbers is within the variation allowance range. When the edge number is not within the variation allowance range, the microcomputer 33 excludes the corresponding wheel 5a-5d from candidate wheels 5a-5d until one wheel 5a-5d remains.

The microcomputer 33 registers the wheel 5a-5d remaining last as the wheel 5a-5d to which the subject transmitter 2 transmitting the frame is fixed. With regard to the frame including the identification information ID1, as shown in FIG. 6A, the front right wheel FR and the rear right wheel RR are excluded first, and then the rear left wheel RL is excluded. The front left wheel FL, which remains last, is registered as the wheel to which the subject transmitter 2 is fixed.

The microcomputer 33 performs the similar determination to the frames including the identification information ID2, ID3, ID4, as shown in FIGS. 6B to 6D. In this way, the wheel to which the subject transmitter 2 transmitting the frame is fixed is specified. As such, all the wheels having the transmitters 2 can be specified.

When the microcomputer 33 specifies which wheel 5a-5d each transmitter 2 is fixed to, the microcomputer 33 stores the relationship between the identification information ID of each transmitter 2 and the position of the corresponding wheel 5a-5d to which the transmitter 2 is fixed.

Figure 7A:
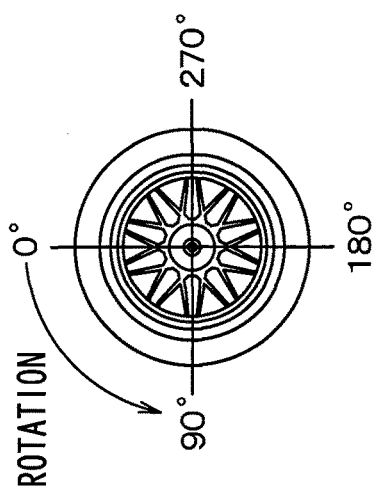
FIG. 7A is a schematic diagram of a wheel for explaining a transmission angular position of the transmitter according to the embodiment.
Figure 7B:
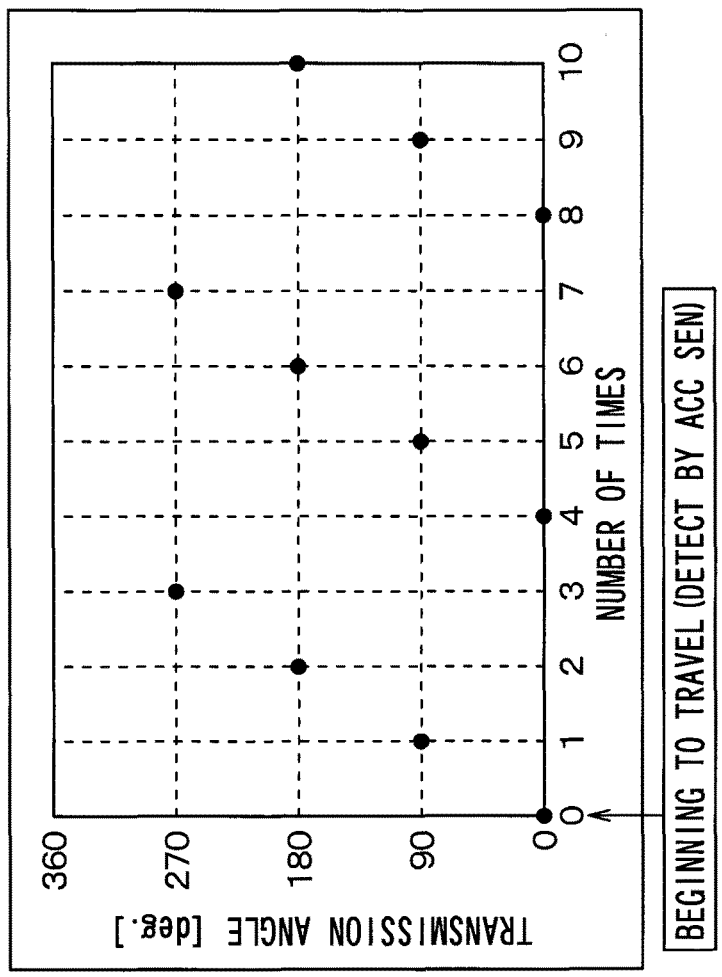
FIG. 7B is a schematic diagram illustrating a relationship between a time that the frame is transmitted and the transmission angular position of the transmitter according to the embodiment.

It is ideal to specify all the wheel positions to which the transmitters 2 are fixed in the above described manner. However, if the transmission angular position of the transmitter 2 when the transmitter 2 transmits the frame coincides with a position where the frame is less likely to reach the TPMS-ECU 3, there is a possibility that the TPMS-ECU 3 cannot receive the frame every time. In the present embodiment, therefore, the transmission angular position of the transmitter 2 is changed each time the transmitter 2 transmits the frame. The change of the transmission angular position is performed by the transmitter 2. FIG. 7A illustrates an example of transmission angular positions of the transmitter 2 in the corresponding wheel 5a-5d, and FIG. 7B illustrates a relationship between the number of times that the frame is transmitted from the transmitter 2 and the transmission angular position of the transmitter 2.

When the vehicle speed reaches the predetermined speed, such as 5 km/h, the transmitter 2 begins to transmit the frame. For example, when the transmitter 2 is at the zero degree position as a first transmission angular position, such as right above the wheel center axis, the frame is transmitted. After 10 seconds elapses, the transmitter 2 transmits the frame when the transmitter 2 is at an angular position shifted by 90 degrees from the first transmission angular position in a direction of rotation of the wheel 5a-5d, such as at the same level as the wheel center axis on a front side of the wheel.

After another 10 seconds elapses, the transmitter 2 transmits the frame when the transmitter 2 is at an angular position shifted by 180 degrees from the first transmission angular position, such as right under the wheel center axis. After further another 10 seconds elapses, the transmitter 2 transmits the frame when the transmitter is at a transmission angular position shifted by 270 degrees from the first transmission angular position, such as at the same level as the wheel center axis on a rear side of the wheel.

In this way, the transmission angular position of the acceleration sensor 22 is changed each time the transmitter 2 transmits the frame. Therefore, the frames are properly received by the TPMS-ECU 3.

When the wheel position detection is performed in the manner described above, the TPMS-ECU 3 needs to confirm at which transmission angular position the frame is transmitted. In the TPMS-ECU 3, the wheel position detection is performed by determining whether the edge number or the tooth number at the reception timing of the frame is within the variation allowance range in regard to the case where the frames are transmitted at the fixed transmission angular position. Therefore, in the case where the transmission angular position of the transmitter 2 is changed each time the frame is transmitted, it is necessary to correct the edge number or the tooth number associated with the frame transmitted at a changed transmission angular position to the edge number or the tooth number associated with the frame transmitted at a fixed transmission angular position.

In this case, the frame may include a transmission count representing the number of times of frame transmission. In place of including the transmission count in the frame, the TPMS-ECU 3 may be configured to realize the transmission angles.

For example, as shown in FIG. 8A, the frame includes the transmission count, in addition to the identification information ID, pressure information, temperature information. In this case, when the TPMS-ECU 3 receives the transmission count, the TPMS-ECU 3 can confirm the transmission angular position when the subject frame is transmitted. That is, the transmission angular position is shifted by a predetermined angle each time the frame is transmitted. Therefore, the number of times represented by the transmission count corresponds to the amount of angle shifted from the first transmission angular position.

As such, based on the transmission count, the edge number or the tooth number at the reception timing is adjusted by the amount corresponding to the amount of angle shifted from the first transmission angular position. Thus, the edge number or the tooth number at the reception timing of the frame where the transmission angular position is not changed is calculated.

For example, when the number of teeth of the gear 12a-12d is 48, and the transmission angular position is shifted by 90 degrees each time of frame transmission, the edge number is corrected by 24 (96×90/360=24). In other words, the tooth number is corrected by 12 (48×90/360=12). Then, it is determined whether the corrected edge number or the tooth number is within the variation allowance range.

FIG. 9 is a diagram illustrating an evaluation result of the wheel position of a case where the transmission angular position is changed each time the frame is transmitted. As shown in FIG. 9, the edge number at the reception timing of each frame is referred to the edge number before the correction. The corrected edge number is obtained by correcting the edge number before the correction by the amount corresponding to the shifted angle. The corrected edge number corresponds to the edge number associated with the frame transmitted at the fixed transmission angular position. Then, the wheel position detection is performed based on the corrected edge numbers.

In FIG. 9, it is not illustrated in regard to a case where the frame is not received because of the transmitter 2 being at the position of the Null. Even if the transmission count is missed at the position of the Null, the edge number or the tooth number is corrected based on the transmission count. Accordingly, even if the frame is not received due to the transmitter 2 being at the position of the Null, the edge number or the tooth number is properly corrected.

In a case where the frame does not include the transmission count, the frame will not be received, similar to the transmission at the position of the Null. In such a case, if the TPMS-ECU 3 receives the vehicle speed from the brake ECU 10, the TPMS-ECU 3 can determine whether the frame is not transmitted due to the vehicle being stopped or the frame is failed to be received. Therefore, even if the vehicle is stopped during the wheel position detection, it is less likely that the wheel position detection is erroneously performed.

FIG. 9 illustrates only the evaluation result of the identification information ID1. Further, the evaluation results of the identification information ID2 to ID4 can be obtained in the similar manner.

FIG. 8B illustrates an example of a frame that includes the identification information ID, the pressure information and the temperature information, but does not include the transmission count. In this case, the TPMS-ECU 3 stores the transmission angle to be shifted by the transmitter 2. Also, the TPMS-ECU 3 measures a time elapsed from the time the frame transmission is begun. The TPMS-ECU 3 estimates that the transmission angular position is shifted by the amount of transmission angle corresponding to the time elapsed.

In this case, even if the TPSM-ECU3 fails to receive the frame due to noise, since the TPMS-ECU 3 can estimate the transmission angle shifted, the TPMS-ECU 3 can correct the edge number or the tooth number at the reception timing of the frame by the amount corresponding to the transmission angle shifted. Then, the TPMS-ECU 3 determines whether the corrected edge number or tooth number is within the variation allowance range to specify the wheel position.

Even in a case where the transmission count is not used, there is a possibility where the frame is not received at the position of the Null. Also in such a case, because the interval of the frame transmission is set at a predetermined interval, the shifted transmission angle can be obtained based on the time elapsed from the reception timing of the frame. Therefore, similar to the case where the transmission count is used, even if the frame is not received at the position of the Null, the edge number or the tooth number is properly corrected.

Each time the transmitter 2 begins the frame transmission when or after it is detected that the vehicle 1 begins to travel, the first frame may be transmitted at the same transmission angular position, such as at the zero degree position right above the wheel center axis. Alternatively, the transmission angular position when the transmitter 2 transmits the first frame may be changed by a predetermined angle every time the transmitter 2 begins the frame transmission. For example, the transmission angular position of the transmitter 2 when the transmitter 2 begins to transmit the first frame may be changed by 90 degrees each time the transmitter 2 begins the frame transmission.

The TPMS-ECU 3 stores the gear information at the reception timing of the frame transmitted when the vehicle speed reaches the predetermined speed. Also, the TPMS-ECU 3 cancels the gear information stored when the vehicle speed is equal to or less than a predetermined vehicle stop determination speed, such as equal to or less than 5 km/h. When the vehicle begins to travel again, the TPMS-ECU 3 newly performs the wheel position detection in the manner described above.

After the wheel position detection is performed in the manner described above, the tire pressure detection is performed. When the tire pressure detection is performed, the frame is transmitted from each of the transmitters 2 at a predetermined interval. The TPMS-ECU 3 receives the frames from all the transmitters 2 each time the transmitter 2 transmit the frames.

The TPMS-ECU 3 determines from which transmitter 2 each of the frames is transmitted based on the ID information stored in the frame, and detects the tire pressure from the information regarding the tire pressure stored in the frame. Thus, the TPMS-ECU 3 determines whether the tire pressure of any of wheels 5a-5d is decreased, and specifies the wheel 5a-5d having the tire whose pressure is decreased. When the TPMS-ECU 3 detects the decrease in tire pressure of any of the wheels 5a-5d, the TPMS-ECU 3 notifies the meter 4 of the detection result. Thus, the meter 4 displays the decrease in the tire pressure with the indication of the subject wheel 5a-5d to notify the driver.

As described above, the gear information indicating the tooth position of each gear 12a-12d rotated with the corresponding wheel 5a-5d is generated based on the detection signal of the wheel speed sensors 11a-11d. The TPMS-ECU 3 acquires the gear information. The transmitter 2 performs the frame transmission. The transmission angular position of the transmitter 2 is changed by a predetermined angle each time the transmitter 2 transmits the frame. Therefore, the chance to receive the frames in the TPMS-ECU 3 increases, even if the frame transmission is affected by noise or the like. As compared to the case where the TPMS-ECU 3 repeatedly fails to receive the frames, the wheel position is specified further properly and in a shorter time.

The variation allowance range is set based on the tooth position at the reception timing of the frame. When the tooth position at a subsequent reception timing of the frame is not within the set variation allowance range, the corresponding wheel 5a-5d is excluded from the candidates of the wheels to which the subject transmitter 2 transmitting the frame is fixed. The wheel 5a-5d remaining last is registered as the wheel to which the subject transmitter 2 is fixed. Therefore, the wheel position is specified with a small amount of data.

Further, the variation allowance range is renewed to a range where the first variation allowance range set based on the tooth position at the first reception timing of the frame and the second variation allowance range set based on the tooth position at the subsequent reception timing of the frame overlap with each other. In this way, the variation allowance range is reduced. Therefore, the wheel position is specified properly in a shorter time.

Considering the Null, the transmitter 2 changes the transmission angular position to transmit the frame each time the transmitter 2 transmits the frame. The TPMS-ECU 3 corrects the edge number or the tooth number at the reception timing of the frame to the edge number or the tooth number associated with the frame transmitted at the fixed transmission angular position. In this case, even if any transmission angular position is at the position of the Null, since the transmitter 2 transmits the frame at different transmission angular positions, the frame can be transmitted from the position other than the position of the Null. Therefore, the wheel position can be properly specified.

The frame transmission is begun when the vehicle speed is equal to or greater than the predetermined speed. Also, the position of the transmitter 2 within the corresponding wheel 5a-5d is detected using the acceleration sensor 22. Therefore, although the wheel position detection is performed only after the vehicle begins to travel, the wheel position detection can be begun immediately after the vehicle begins to travel. The wheel position detection may be performed based on an intensity of a signal outputted from a trigger device. In the present embodiment, on the other hand, the wheel position detection can be performed without using the trigger device.

(Other Embodiments)

In the embodiment described above, the transmitter 2 transmits the frame at the different transmission angular positions, and the TPMS-ECU 3 corrects the edge number or the tooth number associated with the frame transmitted at the different transmission angular position to the edge number or the tooth number associated with the frame transmitted at the fixed transmission angular position. However, it is not always necessary to correct the edge number or the tooth number.

Alternatively, the determination of the wheel position, that is, the determination whether the edge number or the tooth number is within the variation allowance range may be performed using only the edge numbers or the tooth numbers at the reception timings of the frames transmitted at the same transmission angular position. For example, the wheel position detection may be performed only based on the edge numbers or the tooth numbers at the reception timings of the frames transmitted when the transmission angular position is at the zero degree position. As another example, the wheel position detection may be performed only based on the edge numbers or the tooth numbers of the reception timings of the frames transmitted when the transmission angular position is at a 90 degree position.

In the embodiment described above, as the example, the transmission angular position is shifted by 90 degrees each time the transmitter 2 transmits the frame, such as to 0 degree position, 90 degree position, 180 degree position and 270 degree position, in the direction of rotation of the wheel 5a-5d. However, the transmission angular position may be shifted by any angle, other than 90 degrees, in the direction of rotation of the wheel 5a-5d. Also, it is not always necessary to shift the transmission angular position by a fixed angle. For example, the transmission angular position may be shifted by a different angle in the direction of rotation of the wheel as long as the TPMS-ECU 3 can realize the amount of the transmission angular position shifted. That is, the predetermined angle shifted is not limited to the fixed angle, but may be a variable angle.

In the embodiment described above, the position where the transmitter 2 is right above the wheel center axis is defined as the zero position, as the reference position. However, the zero position may be set to any position in a circumferential direction of the wheel 5a-5d.

In the embodiment described above, the TPMS-ECU 3 corrects the tooth position represented by the edge number or the tooth number. In place of correcting the tooth position in the TPMS-ECU 3, the variation allowance range may be changed according to the transmission angular position. For example, a second variation allowance range used for the determination of the edge number or the tooth number at the second reception timing of the frame may be set to a range provided by adding a range of 90 degrees to a range of 90 degrees centering on the first reception angle An1. Further, a third variation allowance range used for the determination of the edge number or the tooth number at the third reception timing of the frame may be set to a range provided by adding a range of 90 degree to an overlapping variation allowance range between of the second variation allowance range and a range of 90 degrees centering on the second reception angle An2. The fourth variation allowance range may be set in the similar manner.

Namely, the variation allowance range may be changed each time the frame is received, and may be set based on the tooth position when the frame is received. Further, an overlapping range between the variation allowance range set when the frame is received and a range to which 90 degrees is added to the variation allowance range set when the previous frame is received may be calculated. Furthermore, the variation allowance range may be set to a range where the previous overlapping variation allowance range and a range to which 90 degrees is added to the previous overlapping variation allowance range overlap with each other. The number of times of adding 90 degrees to the variation allowance range corresponds to the number of times of shifting the transmission angular position. Therefore, the number of times of adding 90 degrees may be set based on the elapsed time from the beginning of the frame transmission or the transmission count. Also in such a case, advantageous effects similar to the case where the edge number of the tooth number is corrected will be achieved.

In the embodiment described above, the transmission count is used. As another example, the edge number or the tooth number to be corrected may be used in place of the transmission count.

In the embodiment described above, the variation allowance range is changed at the reception timing of each frame in such a manner that the variation allowance range gradually reduces. On the other hand, each variation allowance range set centering on the tooth position is constant. However, the variation allowance range set centering on the tooth position may be changeable.

For example, the variation of the tooth positions is likely to increase with an increase in vehicle speed. Therefore, each variation allowance range set centering on the tooth position may be increased with the increase in vehicle speed. In such a case, the variation allowance range may be further properly set.

Detection accuracy at a timing when the angle of the transmitter 2 is at the predetermined angular position is likely to reduce with an increase of the interval of sampling the accelerations in the acceleration detection by the acceleration sensor 22. Therefore, the variation allowance range may be changed according to the decrease in the detection accuracy. Also in such a case, the variation allowance range is further properly set. In this case, the transmitter 2 realizes the interval of sampling the accelerations. Therefore, the transmitter 2 may include data for determining the variation allowance range in the frame.

In the embodiment described above, the TPMS-ECU 3 acquires the gear information from the brake ECU 10. As another example, the TPMS-ECU 3 may acquire the edge number or the tooth number as the gear information from another ECU. As further another example, the TPMS-ECU 30 may receive the detection signals from the wheel speed sensors 11a-11d, and obtain the edge number or the tooth number of each gear 12a-12d based on the detection signal obtained.

In the embodiment described above, the TPMS-ECU 3 and the brake ECU 10 are separate. As another example, the TPMS-ECU 3 and the brake ECU 10 may be integrated into a single ECU. That is, the TPMS-ECU 3 and the brake ECU 10 may be provided by a single ECU. In such a case, the ECU may directly receive the detection signals of the wheel speed sensors 11a-11d, and obtain the edge number or the tooth number of each gear 12a-12d based on the detection signal received.

In this case, the ECU may continuously obtain the edge numbers or the tooth numbers. Therefore, the wheel position detection is performed based on the gear information at an exact reception timing of the frame, differently from the case where the gear information is received at the predetermined interval.

In the embodiment described above, the wheel position detection device is exemplarily employed to the vehicle 1 having four wheels 5a-5d. The wheel position detection device may be employed to a vehicle having wheels other than four.

In the embodiment described above, the variation allowance range is set based on the tooth position of the gear information, and the wheel position is specified by determining whether the tooth position is within the variation allowance range. Further, the variation allowance range is reduced by setting the overlapping range where the previous variation allowance range and the subsequent variation allowance range overlap with each other as the new variation allowance range. In this case, the wheel position is specified in the shorter time.

However, even if the variation allowance range is not reduced, the frame can be properly received by the TPMS-ECU 3 by shifting the transmission angular position of the transmitter 2 by the predetermined angle each time the transmitter 2 transmits the frame. Even in this case, as compared with the case where the frame cannot be continuously received, the wheel position can be specified further properly and in the shorter time. Further, the wheel position is specified by using the variation allowance range of the tooth position. As another example, the wheel position may be specified based on a standard deviation of the tooth positions at the plural frame transmission timings. Also in this case, the similar advantageous effects will be achieved by shifting the transmission angular position of the transmitter 2 every time the frame is transmitted.

In the present disclosure, the wheel speed sensors 11*a*-11*d* detect at least the passage of the teeth of the gears 12*a*-12*d* rotated with the wheels 5*a*-5*d*. The gears 12*a*-12*d* may have a structure in which teeth have conductive outer surfaces and intermediate portions between the teeth have a magnetic resistance different from the outer surfaces of the teeth. Namely, the gears 12*a*-12*d* may have any structure. For example, the gears 12*a*-12*d* may be a general gear having projections and recesses on an outer surface of the gear. The projections have conductivity, and the recesses are spaces providing non-conductive portions. As another example, the gears 12*a*-12*d* may be a rotor switch whose outer surface includes conductive portions and non-conductive insulation portions, as described in JP-A-10-048233.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

The invention claimed is:

1. A wheel position detecting device for a vehicle having a vehicle body and a plurality of wheels, the wheel position detecting device comprising:
   a transmitter being integrated to each of the plurality of wheels, the transmitter including a first control unit, the first control unit generating and transmitting a frame including an identification information specific to the transmitter; and
   a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and a corresponding wheel to which the transmitter is integrated, wherein
   the transmitter includes an acceleration sensor that outputs a detection signal according to an acceleration containing a gravitational acceleration component that varies with rotation of the corresponding wheel to which the transmitter is integrated,
   the first control unit detects an angular position of the transmitter relative to a reference position, based on the gravitational acceleration component provided by the detection signal of the acceleration sensor, the reference position being set at any position in a circumferential direction of the corresponding wheel,
   the first control unit transmits the frame when the transmitter is at a transmission angular position, and
   the first control unit changes the transmission angular position by a predetermined angle each time the frame is transmitted,
   the wheel position detecting device further comprising:
   a wheel speed sensor being disposed to correspond to each of the wheels to detect a tooth of a gear that rotates in association with the corresponding wheel, the gear including conductive portions as teeth and intermediate portions between the conductive potions, the intermediate portions having a magnetic resistance different from the conductive portions, wherein
   the second control unit acquires a gear information indicating a tooth position of the gear based on a detection signal of the wheel speed sensor,
   the second control unit specifies which of the plurality of wheels the transmitter is integrated to based on the tooth position of the gear at a reception timing of the frame,
   the second control unit sets a variation allowance range of the tooth position based on the tooth position of the gear at the reception timing of the frame,
   the second control unit determines whether the tooth position of the gear at a subsequent reception timing of the frame is within the variation allowance range,
   when the tooth position of the gear at the subsequent reception timing is not within the variation allowance range, the second control unit excludes the wheel corresponding to the gear from candidate wheels until one wheel remains, and registers the one wheel as the wheel to which the transmitter is integrated,
   the second control unit changes the variation allowance range each time the frame is received,
   the second control unit sets an overlapping range between the variation allowance range and a previous variation allowance range set based on the tooth position of the gear at a previous reception timing of the frame, as a new variation allowance range,
   the second control unit corrects the tooth position of the gear detected at the reception timing associated with the frame that is transmitted at a transmission angular position changed by the first control unit to a tooth position associated with a frame that is transmitted at a fixed transmission angular position, and
   the second control unit determines whether the teeth position of the gear corrected is within the variation allowance range, to specify the wheel to which the transmitter is integrated.

2. The wheel position detecting device according to claim 1, wherein
   the second control unit increases the variation allowance range with an increase in a vehicle speed.

3. The wheel position detecting device according to claim 1, wherein
the first control unit generates the frame including data for determining the variation allowance range set by the second control unit.

4. A tire pressure detecting apparatus comprising:
the wheel position detecting device according to claim 1, wherein
the transmitter includes a sensing unit that outputs a detection signal according to a tire pressure of the corresponding wheel,
the first control unit generates a tire pressure information indicating the detection signal of the sensing unit,
the first control unit includes the tire pressure information in the frame, and transmits the frame, and
the second control unit detects the tire pressure of each wheel based on the tire pressure information included in the frame.

5. A wheel position detecting device for a vehicle having a vehicle body and a plurality of wheels, the wheel position detecting device comprising:
a transmitter being integrated to each of the plurality of wheels, the transmitter including a first control unit, the first control unit generating and transmitting a frame including an identification information specific to the transmitter; and
a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and a corresponding wheel to which the transmitter is integrated, wherein
the transmitter includes an acceleration sensor that outputs a detection signal according to an acceleration containing a gravitational acceleration component that varies with rotation of the corresponding wheel to which the transmitter is integrated,
the first control unit detects an angular position of the transmitter relative to a reference position, based on the gravitational acceleration component provided by the detection signal of the acceleration sensor, the reference position being set at any position in a circumferential direction of the corresponding wheel,
the first control unit transmits the frame when the transmitter is at a transmission angular position, and
the first control unit changes the transmission angular position by a predetermined angle each time the frame is transmitted,
the wheel position detecting device further comprising:
a wheel speed sensor being disposed to correspond to each of the wheels to detect a tooth of a gear that rotates in association with the corresponding wheel, the gear including conductive portions as teeth and intermediate portions between the conductive potions, the intermediate portions having a magnetic resistance different from the conductive portions, wherein
the second control unit acquires a gear information indicating a tooth position of the gear based on a detection signal of the wheel speed sensor,
the second control unit specifies which of the plurality of wheels the transmitter is integrated to based on the tooth position of the gear at a reception timing of the frame, the second control unit stores the predetermined angle changed by the first control unit,
the second control unit measures a time elapsed since the transmitter begins to transmit the frame, as an elapsed time,
the second control unit estimates the transmission angular position of the transmitter at the reception timing of the frame based on the elapsed time, and
the second control unit corrects the tooth position of the gear detected at the reception timing associated with the frame that is transmitted at a transmission angular position changed by the first control unit to a tooth position associated with a frame that is transmitted at a fixed transmission angular position.

6. A wheel position detecting device for a vehicle having a vehicle body and a plurality of wheels, the wheel position detecting device comprising:
a transmitter being integrated to each of the plurality of wheels, the transmitter including a first control unit, the first control unit generating and transmitting a frame including an identification information specific to the transmitter; and
a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and a corresponding wheel to which the transmitter is integrated, wherein
the transmitter includes an acceleration sensor that outputs a detection signal according to an acceleration containing a gravitational acceleration component that varies with rotation of the corresponding wheel to which the transmitter is integrated,
the first control unit detects an angular position of the transmitter relative to a reference position, based on the gravitational acceleration component provided by the detection signal of the acceleration sensor, the reference position being set at any position in a circumferential direction of the corresponding wheel,
the first control unit transmits the frame when the transmitter is at a transmission angular position, and
the first control unit changes the transmission angular position by a predetermined angle each time the frame is transmitted,
the wheel position detecting device further comprising:
a wheel speed sensor being disposed to correspond to each of the wheels to detect a tooth of a gear that rotates in association with the corresponding wheel, the gear including conductive portions as teeth and intermediate portions between the conductive potions, the intermediate portions having a magnetic resistance different from the conductive portions, wherein
the second control unit acquires a gear information indicating a tooth position of the gear based on a detection signal of the wheel speed sensor,
the second control unit specifies which of the plurality of wheels the transmitter is integrated to based on the tooth position of the gear at a reception timing of the frame,
the first control unit generates the frame including a transmission count representing a number of times of frame transmission, and the second control unit corrects the tooth position of the gear detected at the reception timing associated with the frame that is transmitted at a transmission angular position changed by the first control unit to a tooth position associated with a frame transmitted at a fixed transmission angular position, based on the transmission count.

7. A wheel position detecting device for a vehicle having a vehicle body and a plurality of wheels, the wheel position detecting device comprising:
  a transmitter being integrated to each of the plurality of wheels, the transmitter including a first control unit, the first control unit generating and transmitting a frame including an identification information specific to the transmitter; and
  a receiver being integrated to the vehicle body, the receiver including an antenna and a second control unit, the second control unit receiving the frame transmitted from the transmitter through the antenna, the second control unit performing a wheel position detection to specify which of the plurality of wheels the transmitter transmitting the frame is integrated to and to store a relationship between the identification information of the transmitter and a corresponding wheel to which the transmitter is integrated, wherein
  the transmitter includes an acceleration sensor that outputs a detection signal according to an acceleration containing a gravitational acceleration component that varies with rotation of the corresponding wheel to which the transmitter is integrated,
  the first control unit detects an angular position of the transmitter relative to a reference position, based on the gravitational acceleration component provided by the detection signal of the acceleration sensor, the reference position being set at any position in a circumferential direction of the corresponding wheel,
  the first control unit transmits the frame when the transmitter is at a transmission angular position, and
  the first control unit changes the transmission angular position by a predetermined angle each time the frame is transmitted,
  the wheel position detecting device further comprising:
  a wheel speed sensor being disposed to correspond to each of the wheels to detect a tooth of a gear that rotates in association with the corresponding wheel, the gear including conductive portions as teeth and intermediate portions between the conductive potions, the intermediate portions having a magnetic resistance different from the conductive portions, wherein
  the second control unit acquires a gear information indicating a tooth position of the gear based on a detection signal of the wheel speed sensor,
  the second control unit sets a variation allowance range of the tooth position based on the tooth position of the gear at the reception timing of the frame,
  the second control unit of the receiver determines whether the tooth position of the gear at a subsequent reception timing of the frame is within the variation allowance range,
  when the tooth position of the gear at the subsequent reception timing is not within the variation allowance range, the second control unit excludes the wheel corresponding to the gear from candidate wheels until one wheel remains, and registers the one wheel as the wheel to which the transmitter is integrated,
  the second control unit changes the variation allowance range each time the frame is received,
  the second control unit calculates an overlapping range between the variation allowance range and a first added variation allowance range that is provided by adding a predetermined variation allowance range to a previous variation allowance range set at a previous reception timing of the frame, and
  the second control unit sets a second added variation allowance range that is provided by adding the predetermined variation allowance range to the overlapping range calculated, as a new variation allowance range.

\* \* \* \* \*